(12) United States Patent
Zhang

(10) Patent No.: US 10,666,789 B2
(45) Date of Patent: May 26, 2020

(54) CONTROL METHOD AND DEVICE FOR SENSORS OF MOBILE TERMINAL, STORAGE MEDIUM AND MOBILE TERMINAL

(71) Applicant: GUANGDONG OPPO MOBILE TELECOMMUNICATIONS CORP., LTD., Dongguan, Guangdong (CN)

(72) Inventor: Qiang Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/483,693

(22) PCT Filed: Oct. 17, 2017

(86) PCT No.: PCT/CN2017/106612
§ 371 (c)(1),
(2) Date: Aug. 5, 2019

(87) PCT Pub. No.: WO2018/141167
PCT Pub. Date: Aug. 9, 2018

(65) Prior Publication Data
US 2020/0028957 A1 Jan. 23, 2020

(30) Foreign Application Priority Data

Feb. 4, 2017 (CN) .......................... 2017 1 0065209

(51) Int. Cl.
*H04M 1/00* (2006.01)
*H04M 1/725* (2006.01)
(Continued)

(52) U.S. Cl.
CPC ........ *H04M 1/7258* (2013.01); *G06F 1/3209* (2013.01); *G06F 1/3243* (2013.01);
(Continued)

(58) Field of Classification Search
CPC ........... H04M 1/7258; H04M 1/72569; H04M 2201/14; H04M 2250/12; G06F 1/3209; G06F 1/3243
(Continued)

(56) References Cited

U.S. PATENT DOCUMENTS 9,167,527 B2 * 10/2015 Song ................. H04W 52/0251
9,693,310 B2 * 6/2017 Song ................. H04W 52/0251
(Continued)

FOREIGN PATENT DOCUMENTS

CN 104503565 A 4/2015
CN 105843365 A 8/2016
(Continued)

OTHER PUBLICATIONS

International Search Report (ISR) and Written Opinion (WO) dated Jan. 18, 2018 for Application No. PCT/CN2017/106612.
(Continued)

*Primary Examiner* — Sonny Trinh
(74) *Attorney, Agent, or Firm* — Ladas & Parry LLP

(57) ABSTRACT

A control method for sensors of a mobile terminal is provided, which includes: a to-be-enabled sensor in the sensors of the mobile terminal is determined according to a sensor enabling instruction; when determining that a sensor power-on event of the mobile terminal is triggered, a power-on delay of a target sensor of the mobile terminal is acquired, wherein the target sensor at least includes the to-be-enabled sensor and, when there is one target sensor, the power-on
(Continued)

delay of the target sensor is shorter than a maximum power-on delay of the sensors of the mobile terminal; in response to determining that the power-on delay corresponding to the target sensor is reached at a present moment, state resetting is executed on the target sensor; and when the state resetting is completed, the to-be-enabled sensor is enabled to become an enabled sensor, and acquired data of the enabled sensor is reported.

14 Claims, 4 Drawing Sheets

(51) Int. Cl.
G06F 1/3209 (2019.01)
G06F 1/3234 (2019.01)

(52) U.S. Cl.
CPC .... *H04M 1/72569* (2013.01); *H04M 2201/14* (2013.01); *H04M 2250/12* (2013.01)

(58) Field of Classification Search
USPC ....................................... 455/550.1
See application file for complete search history.

(56) References Cited

U.S. PATENT DOCUMENTS

| | | | |
|---|---|---|---|
| 10,111,175 B2* | 10/2018 | Song | H04W 52/0251 |
| 2009/0184849 A1* | 7/2009 | Nasiri | G01C 19/42 341/20 |
| 2009/0259865 A1* | 10/2009 | Sheynblat | G06F 1/3203 713/323 |
| 2010/0235667 A1* | 9/2010 | Mucignat | G06F 1/3203 713/323 |
| 2010/0302028 A1* | 12/2010 | Desai | H04W 52/0258 340/539.3 |
| 2013/0039230 A1 | 2/2013 | Lee et al. | |
| 2015/0005039 A1 | 1/2015 | Liu et al. | |

FOREIGN PATENT DOCUMENTS

| | | |
|---|---|---|
| CN | 108249874 A | 12/2016 |
| CN | 108255937 A | 12/2016 |
| CN | 106850985 A | 6/2017 |

OTHER PUBLICATIONS

The extended European search report for the EP patent application No. 17894709.9, dated Jan. 9, 2020.

* cited by examiner

CONTROL METHOD AND DEVICE FOR SENSORS OF MOBILE TERMINAL, STORAGE MEDIUM AND MOBILE TERMINAL

CROSS-REFERENCE TO RELATED APPLICATIONS

The present application is a national stage application of International Patent Application No. PCT/CN2017/106612, which is filed on Oct. 17, 2017 and claims benefit to Chinese Patent Application No. 201710065209.X, filed on Feb. 4, 2017 and entitled "Control Method and Device for Sensors of Mobile Terminal, and Mobile Terminal", the contents of which are hereby incorporated by reference in its entirety.

TECHNICAL FIELD

Embodiments of the application relate to the technical field of data processing, and particularly to a control method and device for sensors of a mobile terminal, a storage medium and a mobile terminal.

BACKGROUND

A mobile terminal such as a mobile phone is integrated with various types of sensors configured to assist in realization of various functions of the mobile phone. For example, an ambient light sensor may be configured to regulate brightness of automatic backlight of a screen of the mobile phone, a proximity sensor may be configured to assist in controlling the screen to be turned on and turned off, an acceleration sensor may be configured for step counting, a gravity sensor may be applied to a gravity sensing type game, a magnetic field sensor may be applied to map navigation and a compass, and a gyroscope may be configured to control a viewing angle in a game and implement inertial navigation and the like according to a motion state of an object when there is no signal of a Global Positioning System (GPS).

SUMMARY

The embodiments of the application provide a control method and device for sensors of a mobile terminal, a storage medium and a mobile terminal, which may increase a reporting speed of sensor data of the mobile terminal.

The embodiments of the application provide a control method for sensors of a mobile terminal, which may include that:

a to-be-enabled sensor in the sensors of the mobile terminal is determined according to a sensor enabling instruction;

in response to detecting that a sensor power-on event of the mobile terminal is triggered, a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal;

in response to determining that the power-on delay corresponding to the target sensor is reached at a present moment, state resetting is executed on the target sensor; and in response to detecting that state resetting of the to-be-enabled sensor is completed, the to-be-enabled sensor is enabled to become an enabled sensor, and acquired data of the enabled sensor is reported.

The embodiments of the application provide a control device for sensors of a mobile terminal, which may include:

a to-be-enabled sensor determination module, configured to determine a to-be-enabled sensor in the sensors of the mobile terminal according to a sensor enabling instruction;

a power-on delay acquisition module, configured to acquire, in response to detecting that a sensor power-on event of the mobile terminal is triggered, a power-on delay of a target sensor of the mobile terminal, wherein the target sensor at least includes the to-be-enabled sensor and, in a case where there is one target sensor, the power-on delay of the target sensor is shorter than a maximum power-on delay of the sensors of the mobile terminal;

a target sensor state resetting module, configured to execute, in response to determining that the power-on delay corresponding to the target sensor is reached at a present moment, state resetting on the target sensor; and a sensor data reporting module, configured to, in response to detecting that state resetting of the to-be-enabled sensor is completed, enable the to-be-enabled sensor so that the to-be-enabled sensor becomes an enabled sensor, and report acquired data of the enabled sensor.

The embodiments of the application provide a storage medium, in which multiple instructions may be stored, the instructions being suitable to be loaded by a processor to execute the control method for the sensors of the mobile terminal in the embodiments of the application.

The embodiments of the application provide a mobile terminal, which may include a memory, a processor and a computer program stored in the memory and capable of running on a processor, the processor executing the computer program to implement the following operations:

a to-be-enabled sensor in sensors of the mobile terminal is determined according to a sensor enabling instruction;

in response to detecting that a sensor power-on event of the mobile terminal is triggered, a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal;

in response to determining that the power-on delay corresponding to the target sensor is reached at a present moment, state resetting is executed on the target sensor; and in response to detecting that state resetting of the to-be-enabled sensor is completed, the to-be-enabled sensor is enabled to become an enabled sensor, and acquired data of the enabled sensor is reported.

According to the control method and device for the sensors of the mobile terminal, storage medium and mobile terminal provided in the embodiments of the application, a reporting speed of sensor data of the mobile terminal may be increased.

DETAILED DESCRIPTION OF THE EMBODIMENTS

Figure 1:
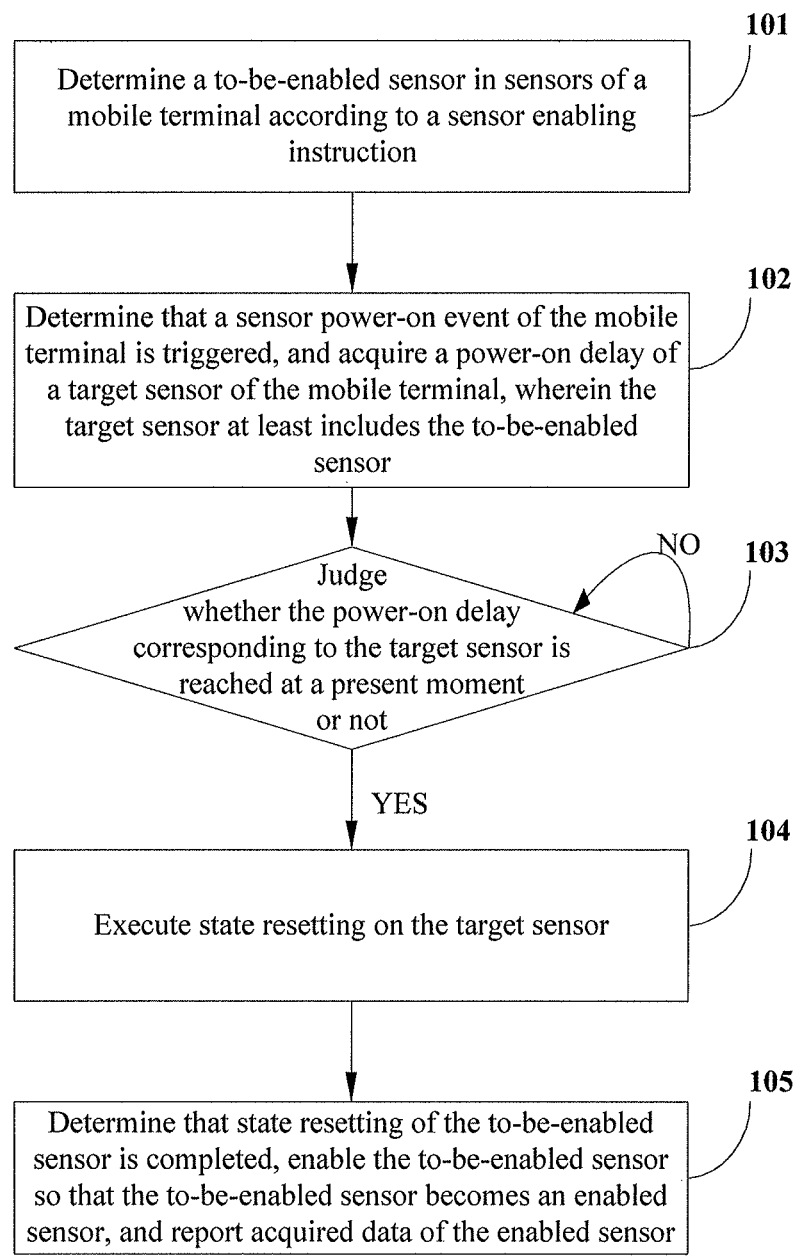
FIG. 1 is a flowchart of a control method for sensors of a mobile terminal according to an embodiment of the application.

In order to make the purpose, technical solutions and advantages of the application clearer, exemplary embodiments of the application will further be described below in combination with the drawings in detail. It can be understood that the exemplary embodiments described herein are adopted only to explain the application and not intended to limit the application. It is also to be noted that, for convenient description, not all contents but only parts related to the application are illustrated in the drawings. It is to be mentioned before more detailed discussions about exemplary embodiments that some exemplary embodiments are described as processing or methods described in the flowcharts. Although each operation (or step) is described into sequential processing in the flowcharts, many operations therein may be implemented in parallel, concurrently or simultaneously. In addition, a sequence of each operation may be rearranged. When the operations are completed, processing may be terminated, but there may also be additional operations not included in the drawings. Processing may correspond to a method, a function, a procedure, a subroutine, a subprogram and the like.

When a mobile terminal is woken from a dormant state, sensors may usually be controlled through the following process: powering-on each sensor, waiting for a power-on delay for each sensor, performing state resetting for each sensor, enabling one or more sensors, and reporting data of the one or more enabled sensors. A control method for sensors of a mobile terminal in a related art has defects and therefore needs to be improved.

An embodiment of the application provides a control method for sensors of a mobile terminal, which includes that:

a to-be-enabled sensor in the sensors of the mobile terminal is determined according to a sensor enabling instruction;

it is determined that a sensor power-on event of the mobile terminal is triggered, and a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal;

in response to determining that the power-on delay corresponding to the target sensor is reached at a present moment, state resetting is executed on the target sensor; and it is determined that state resetting of the to-be-enabled sensor is completed, the to-be-enabled sensor is enabled to become an enabled sensor, and acquired data of the enabled sensor is reported.

In an implementation mode, the operation that the power-on delay of the target sensor of the mobile terminal is acquired includes that:

a first power-on delay of the to-be-enabled sensor is acquired; and the operation that the state resetting is executed on the target sensor in response to determining that the power-on delay corresponding to the target sensor is reached at the present moment includes that:

in response to determining that the first power-on delay is reached at the present moment, the state resetting is executed on the to-be-enabled sensor.

In an implementation mode, the operation that the power-on delay of the target sensor of the mobile terminal is acquired includes that:

a power-on delay of each sensor of the mobile terminal is acquired; and the operation that the state resetting is executed on the target sensor in response to determining that the power-on delay corresponding to the target sensor is reached at the present moment includes that:

in response to determining that the power-on delay of a corresponding sensor in each sensor is reached at the present moment, the state resetting is executed on the corresponding sensor.

In an implementation mode, after the operation that the acquired data of the enabled sensor is reported, the method further includes that:

the state resetting is executed on sensors, except the enabled sensor, in the mobile terminal.

In an implementation mode, the control method for the sensors of the mobile terminal further includes that:

in response to determining that the maximum power-on delay of the sensors of the mobile terminal is reached at the present moment, the state resetting is executed on sensors, except the enabled sensor, in the mobile terminal.

In an implementation mode, the control method for the sensors of the mobile terminal further includes that:

a timer is started at the same time of determining that the sensor power-on event of the mobile terminal is triggered; and the operation that the state resetting is executed on the corresponding sensor in response to determining that the power-on delay of the corresponding sensor in each sensor is reached at the present moment includes that:

in response to determining that a timing value of the timer reaches the power-on delay of the corresponding sensor in each sensor, the state resetting is executed on the corresponding sensor.

FIG. 1 is a flowchart of a control method for sensors of a mobile terminal according to an embodiment of the application. The method of the embodiment may be executed by a control device for sensors of a mobile terminal. The device may be implemented by hardware and/or software. The device may be arranged in the mobile terminal as a part of the mobile terminal.

As shown in FIG. 1, the control method for the sensors of the mobile terminal in the embodiment includes the following operations.

In operation 101, a to-be-enabled sensor in the sensors of the mobile terminal is determined according to a sensor enabling instruction.

In the embodiment, the mobile terminal includes, but is not limited to, a device such as a mobile phone, a notebook computer and a tablet computer, and the sensors of the mobile terminal include, but are not limited to, an ambient light sensor, a proximity sensor, an acceleration sensor, a gravity sensor, a magnetic field sensor, a gyroscope, a fingerprint sensor, a hall sensor, an air pressure sensor, a heartbeat sensor, an ultraviolet sensor and the like.

An application of the mobile terminal, when needing to acquire data by use of a sensor, may send a sensor enabling instruction to a hardware abstract layer of the mobile terminal through an application layer of the mobile terminal. For example, when the mobile terminal changes from a screen-off state to a screen-on state, some applications (for example, a false triggering prevention application) may send enabling instructions of enabling the proximity sensor to the hardware abstract layer to acquire data of the proximity sensor, and some applications (for example, an automatic backlight regulation application) may send enabling instructions of enabling the ambient light sensor to the hardware abstract layer to acquire data of the ambient light sensor. There are many sensors in the mobile terminal, only one or more sensors may be to be enabled, and the one or more sensors of this type are called one or more to-be-enabled sensors. Then, the one or more to-be-enabled sensors in the sensors of the mobile terminal may be determined according to the sensor enabling instructions. After a sensor is enabled, data may be acquired by use of the sensor. For example, an ambient light parameter is acquired by use of the ambient light sensor, and a distance parameter between a user or another target object and the mobile terminal is acquired by use of the proximity sensor. Herein, there may be one or more to-be-enabled sensors.

In operation 102, it is determined that that a sensor power-on event of the mobile terminal is triggered, and a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal.

That the sensor power-on event of the mobile terminal is triggered includes that the mobile terminal is woken from a dormant state (for example, changing from the screen-off state to the screen-on state), or that the sensors are woken from the dormant state or that the sensor enabling instruction is detected.

The power-on delay refers to a minimum time duration started from a power-on moment to ensure stable and normal power-on of the sensor. The power-on delay of each sensor may be different. For example, the power-on delay of the ambient light sensor is 20 ms, the power-on delay of the proximity sensor is 30 ms, while the power-on delay of the gyroscope is 150 ms.

The target sensor may be the to-be-enabled sensor, and may alternatively include the to-be-enabled sensor and the other sensors.

In operation 103, whether power-on delay corresponding to the target sensor is reached at a present moment or not is judged, if the power-on delay corresponding to the target sensor is reached at the present moment, operation 104 is executed, otherwise operation 103 is continued to be executed until the power-on delay is reached at the present moment.

The inventor finds that many sensors in the mobile terminal share an Inter-Integrated Circuit (I2C) and a power supply and thus all of the sensors may be simultaneously powered on during power-on of the sensors. A maximum power-on delay in the power-on delays of all the sensors may be selected as the power-on delay to ensure normal power-on of each sensor. For example, the gyroscope usually requires a relatively long power-on delay as long as 150 ms, but the power-on delay of the ambient light sensor or the proximity sensor is short or even not required. Even if the ambient light sensor only needs to be enabled for an application, state resetting and enabling of the ambient light sensor can be executed only after the delay of 150 ms, which greatly delays data reporting of the ambient light sensor and reduces a reporting speed of sensor data.

In a first example, if the target sensor includes the ambient light sensor and the proximity sensor, both of which are to-be-enabled sensors, state resetting is executed on the ambient light sensor 20 ms after power-on is started, and the state resetting is executed on the proximity sensor 30 ms after power-on is started.

In a second example, if the target sensor includes the ambient light sensor which is a to-be-enabled sensor and another sensor, i.e., the gyroscope, the state resetting is executed on the ambient light sensor 20 ms after power-on is started, and the state resetting is executed on the gyroscope 150 ms after power-on is started.

Herein, initial states of some sensors may be abnormal and thus state resetting is executed to ensure that the powered-on sensors are in normal states.

In operation 104, state resetting is executed on the target sensor.

In response to determining that the power-on delay corresponding to the target sensor is reached at the present moment, the state resetting is executed on the target sensor.

If there are multiple target sensors, in response to determining that the power-on delay of a certain sensor is reached, the state resetting is executed on this sensor.

In operation 105, it is determined that state resetting of the to-be-enabled sensor is completed, the to-be-enabled sensor is enabled to become an enabled sensor, and acquired data of the enabled sensor is reported.

In a process of executing the resetting operation on the target sensor, if state resetting of the to-be-enabled sensor is completed, the to-be-enabled sensor is enabled to become an enabled sensor.

In the first example, the state resetting is executed on the ambient light sensor 20 ms after power-on is started, and in response to determining that state resetting of the ambient light sensor is completed, the ambient light sensor is enabled, and acquired data of the ambient light sensor is reported. Also in the first example, the state resetting is executed on the proximity sensor 30 ms after power-on is started, and in response to determining that state resetting of the proximity sensor is completed, the proximity sensor is enabled, and acquired data of the proximity sensor is reported. Compared with executing state resetting on the proximity sensor and the ambient light sensor and enabling the proximity sensor and the ambient light sensor 150 ms after power-on, this manner has the advantage that the reporting speed of the sensor data is greatly increased.

In the second example, the state resetting is executed on the ambient light sensor 20 ms after power-on is started, and in response to determining that state resetting of the ambient light sensor is completed, the ambient light sensor is enabled, and the acquired data of the ambient light sensor is reported. Also in the second example, the state resetting is executed on the gyroscope 150 ms after power-on is started.

It is to be noted that operation 105 may be executed in a process of executing operation 104 and may alternatively be executed after operation 104 is executed. FIG. 1 exemplarily illustrates an execution sequence of operations 104 and 105. Exemplarily, if the target sensor is the ambient light sensor which is a to-be-enabled sensor, after operation 104 is executed to execute the state resetting on the ambient light sensor, operation 105 is executed to determine that state resetting of the ambient light sensor is completed and enable the ambient light sensor. In the second example, after operation 104 is executed to execute the state resetting on the ambient light sensor 20 ms after power-on is started, operation 105 is executed to determine that state resetting of the ambient light sensor is completed and enable the ambient light sensor, and then operation 104 is re-executed to execute the state resetting on the gyroscope.

Figure 2:
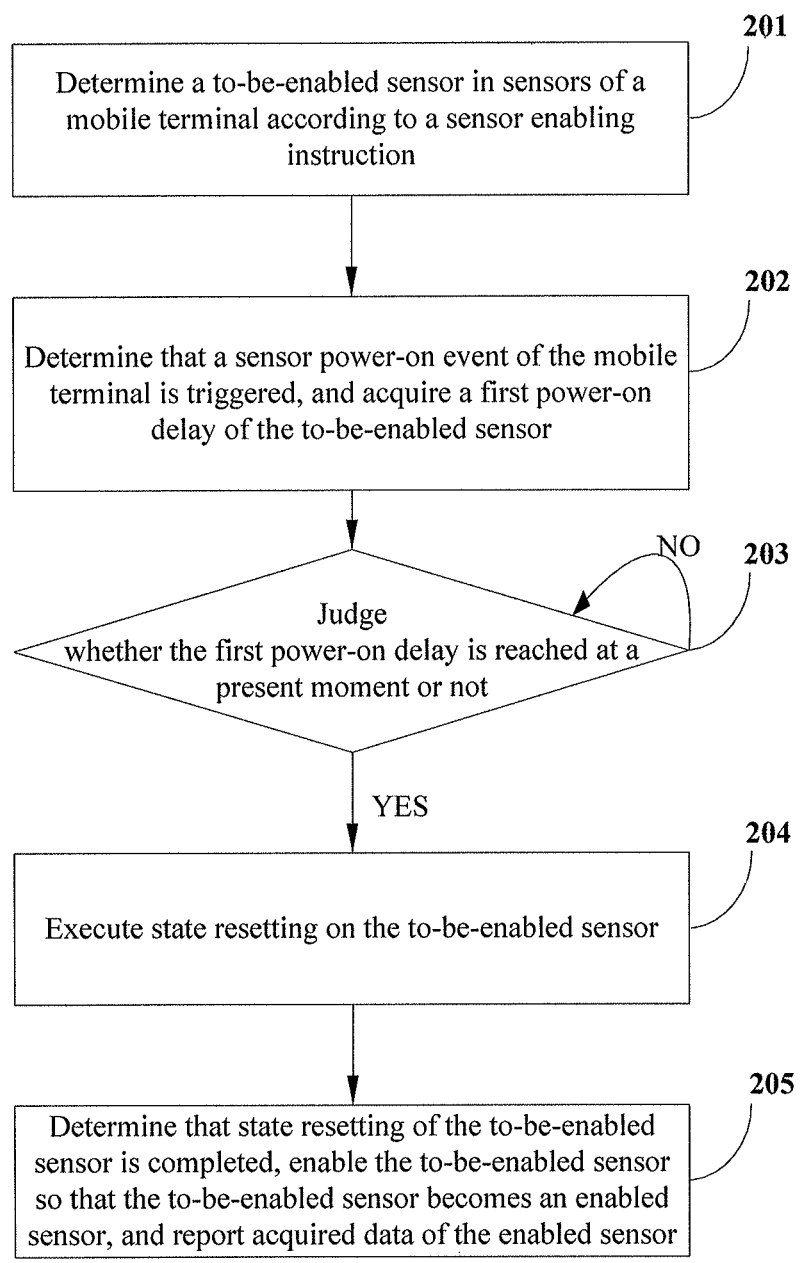
FIG. 2 is a flowchart of a control method for sensors of a mobile terminal according to an embodiment of the application.

FIG. 2 is a flowchart of a control method for sensors of a mobile terminal according to an embodiment of the application. As shown in FIG. 2, the method provided in the embodiment includes the following operations.

In operation 201, a to-be-enabled sensor in the sensors of the mobile terminal is determined according to a sensor enabling instruction.

In operation 202, it is determined that a sensor power-on event of the mobile terminal is triggered, and a first power-on delay of the to-be-enabled sensor is acquired.

When there are multiple to-be-enabled sensors, there are correspondingly multiple first power-on delays.

In operation 203, whether the first power-on delay is reached at a present moment or not is judged, if the first power-on delay is reached at the present moment, operation 204 is executed, otherwise operation 203 is continued to be executed until the first power-on delay is reached at the present moment.

In operation 204, state resetting is executed on the to-be-enabled sensor.

When there are multiple first power-on delays, in response to determining that the first power-on delay of a certain sensor is reached at the present moment, the state resetting may be executed on this sensor.

In operation 205, it is determined that state resetting of the to-be-enabled sensor is completed, the to-be-enabled sensor is enabled to become an enabled sensor, and acquired data of the enabled sensor is reported.

When there are multiple to-be-enabled sensors, in response to determining that state resetting of a certain sensor therein is completed, the sensor is immediately enabled.

After the operation that the acquired data of the enabled sensor is reported, the method may further include that: the state resetting is executed on sensors, except the enabled sensor, in the mobile terminal.

In response to determining that a maximum power-on delay of the sensors of the mobile terminal is reached at the present moment, the state resetting is executed on sensors, except the enabled sensor, in the mobile terminal.

Figure 3:
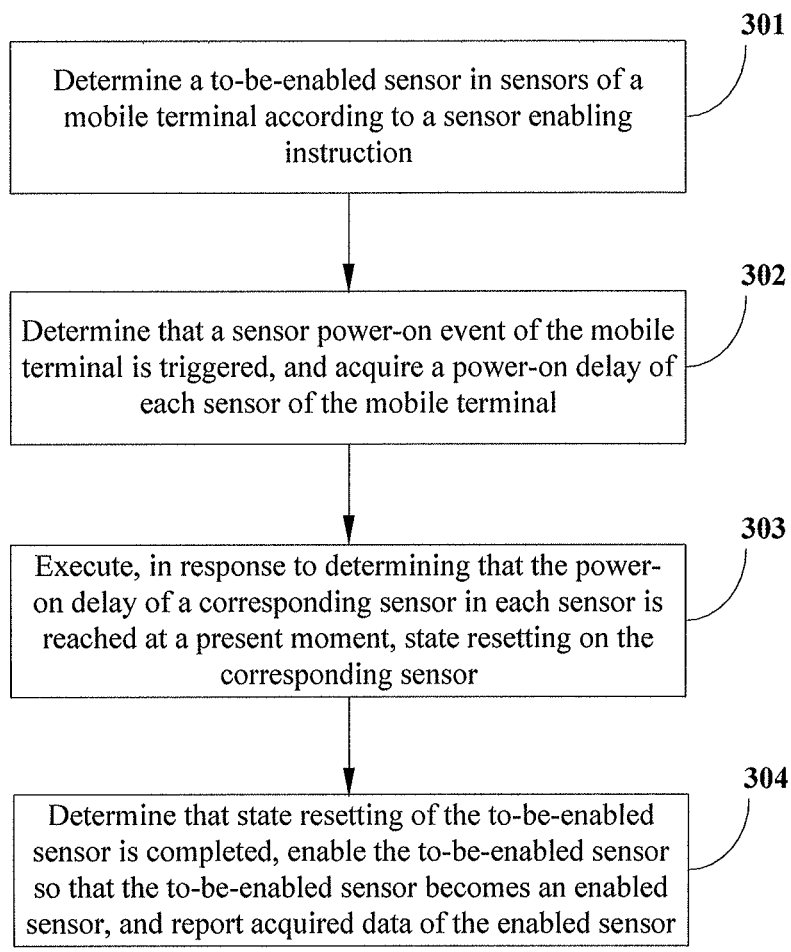
FIG. 3 is a flowchart of a control method for sensors of a mobile terminal according to an embodiment of the application.

FIG. 3 is a flowchart of a control method for sensors of a mobile terminal according to an embodiment of the application. As shown in FIG. 3, the control method for the sensors of the mobile terminal in the embodiment includes the following operations.

In operation 301, a to-be-enabled sensor in the sensors of the mobile terminal is determined according to a sensor enabling instruction.

In operation 302, it is determined that a sensor power-on event of the mobile terminal is triggered, and a power-on delay of each sensor of the mobile terminal is acquired.

In operation 303, in response to determining that the power-on delay of a corresponding sensor in each sensor is reached at a present moment, state resetting is executed on the corresponding sensor.

The operation 303 may include that: each power-on delay corresponding to each sensor is determined according to a sequence from short to long power-on delays; each power-on delay is determined as a present power-on delay respectively; and in response to determining that the present power-on delay is reached at the present moment, the state resetting is executed on the sensor corresponding to the present power-on delay.

Exemplarily, the power-on delays of each sensor of the mobile terminal are 20 ms, 30 ms, 50 ms and 150 ms respectively. Then, the state resetting is executed on the sensor with the 20 ms power-on delay 20 ms after power-on is started, the state resetting is executed on the sensor with the 30 ms power-on delay 30 ms after power-on is started, the state resetting is executed on the sensor with the 50 ms power-on delay 50 ms after power-on is started, and finally the state resetting is executed on the sensor with the 150 ms power-on delay 150 ms after power-on is started.

In operation 304, it is determined that state resetting of the to-be-enabled sensor is completed, the to-be-enabled sensor is enabled to become an enabled sensor, and acquired data of the enabled sensor is reported.

A timer is started at the same time of determining that the sensor power-on event of the mobile terminal is triggered. Correspondingly, operation 303 may include that: in response to determining that a timing value of the timer reaches the power-on delay of the corresponding sensor in each sensor, the state resetting is executed on the corresponding sensor. Herein, the operation that the state resetting is executed on the corresponding sensor in response to determining that the power-on delay of the corresponding sensor in each sensor is reached at the timing value of the timer may include that: each power-on delay corresponding to each sensor is determined; each power-on delay is determined as a present power-on delay; and in response to determining that the present power-on delay is reached at the timing value of the timer, the state resetting is executed on the sensor corresponding to the present power-on delay.

An embodiment of the application provides a control device for sensors of a mobile terminal, which includes:

a to-be-enabled sensor determination module, configured to determine a to-be-enabled sensor in the sensors of the mobile terminal according to a sensor enabling instruction;

a power-on delay acquisition module, configured to determine that a sensor power-on event of the mobile terminal is triggered and acquire a power-on delay of a target sensor of the mobile terminal, wherein the target sensor at least includes the to-be-enabled sensor and, in a case where there is one target sensor, the power-on delay of the target sensor is shorter than a maximum power-on delay of the sensors of the mobile terminal;

a target sensor state resetting module, configured to execute, in response to determining that the power-on delay corresponding to the target sensor is reached at a present moment, state resetting on the target sensor; and a sensor data reporting module, configured to determine that state resetting of the to-be-enabled sensor is completed, enable the to-be-enabled sensor so that the to-be-enabled sensor becomes an enabled sensor, and report acquired data of the enabled sensor.

In an implementation mode, the power-on delay acquisition module is configured to determine that the sensor power-on event of the mobile terminal is triggered and acquire a first power-on delay of the to-be-enabled sensor; and the target sensor state resetting module is configured to execute, in response to determining that the first power-on delay is reached at the present moment, the state resetting on the to-be-enabled sensor.

In an implementation mode, the power-on delay acquisition module is configured to determine that the sensor power-on event of the mobile terminal is triggered and acquire a power-on delay of each sensor of the mobile terminal; and the target sensor state resetting module is configured to execute, in response to determining that the power-on delay of a corresponding sensor in each sensor is reached at the present moment, the state resetting on the corresponding sensor.

In an implementation mode, the device further includes:

a first other sensor state resetting module, configured to, after the acquired data of the enabled sensor is reported, execute the state resetting on sensors, except the enabled sensor, in the mobile terminal.

In an implementation mode, device further includes:

a second other sensor state resetting module, configured to, in response to determining that the maximum power-on delay of the sensors of the mobile terminal is reached at the present moment, execute the state resetting on sensors, except the enabled sensor, in the mobile terminal.

In an implementation mode, the device further includes:

a timer starting module, configured to start a timer at the same time of determining that the sensor power-on event of the mobile terminal is triggered; and the operation that the target sensor state resetting module executes, in response to determining that the power-on delay of a corresponding sensor in each sensor is reached at the present moment, the state resetting on the corresponding sensor includes that:

in response to determining that a timing value of the timer reaches the power-on delay of the corresponding sensor in each sensor, the state resetting is executed on the corresponding sensor.

Figure 4:
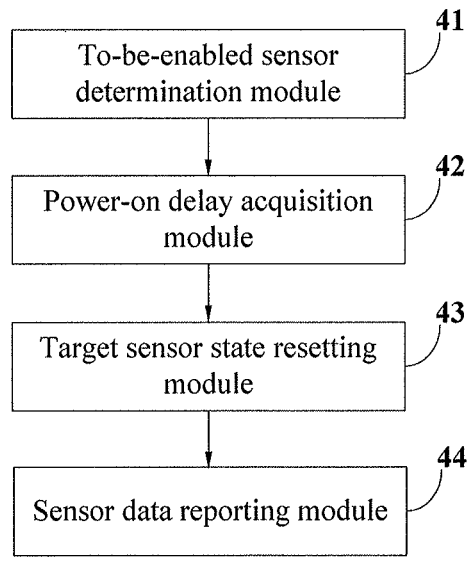
FIG. 4 is a structure diagram of a control device for sensors of a mobile terminal according to an embodiment of the application.

FIG. 4 is a structure block diagram of a control device for sensors of a mobile terminal according to an embodiment of the application. The device may be implemented by software and/or hardware, and is integrated into a mobile terminal. As shown in FIG. 4, the device includes a to-be-enabled sensor determination module 41, a power-on delay acquisition module 42, a target sensor state resetting module 43 and a sensor data reporting module 44.

The to-be-enabled sensor determination module 41 is configured to determine a to-be-enabled sensor in the sensors of the mobile terminal according to a sensor enabling instruction.

The power-on delay acquisition module 42 is configured to determine that a sensor power-on event of the mobile terminal is triggered and acquire a power-on delay of a target sensor of the mobile terminal, wherein the target sensor at least includes the to-be-enabled sensor and, in a case where there is one target sensor, the power-on delay of the target sensor is shorter than a maximum power-on delay of the sensors of the mobile terminal.

The target sensor state resetting module 43 is configured to execute, in response to determining that the power-on delay corresponding to the target sensor is reached at a present moment, state resetting on the target sensor.

The sensor data reporting module 44 is configured to determine that state resetting of the to-be-enabled sensor is completed, enable the to-be-enabled sensor so that the to-be-enabled sensor becomes an enabled sensor, and report acquired data of the enabled sensor.

The power-on delay acquisition module 42 is configured to determine that the sensor power-on event of the mobile terminal is triggered and acquire a first power-on delay of the to-be-enabled sensor; and the target sensor state resetting module 43 is configured to execute, in response to determining that the first power-on delay is reached at the present moment, the state resetting on the to-be-enabled sensor.

The power-on delay acquisition module 42 is configured to determine that the sensor power-on event of the mobile terminal is triggered and acquire a power-on delay of each sensor of the mobile terminal; and the target sensor state resetting module 43 is configured to execute, in response to determining that the power-on delay of a corresponding sensor in each sensor is reached at the present moment, the state resetting on the corresponding sensor.

The device may further include a first other sensor state resetting module, configured to, after the acquired data of the enabled sensor is reported, execute the state resetting on sensors, except the enabled sensor, in the mobile terminal.

The device may further include a second other sensor state resetting module, configured to, in response to determining that the maximum power-on delay of the sensors of the mobile terminal is reached at the present moment, execute the state resetting on sensors, except the enabled sensor, in the mobile terminal.

The device may further include a timer starting module, configured to start a timer at the same time of determining that the sensor power-on event of the mobile terminal is triggered; and the operation that the target sensor state resetting module 43 executes, in response to determining that the power-on delay of a corresponding sensor in each sensor is reached at the present moment, the state resetting on the corresponding sensor includes that:

in response to determining that a timing value of the timer reaches the power-on delay of the corresponding sensor in each sensor, the state resetting is executed on the corresponding sensor.

An embodiment of the application provides a storage medium, in which multiple instructions are stored, the instructions being suitable to be loaded by a processor to execute the control method for the sensors of the mobile terminal in the embodiments of the application. An embodiment of the application provides a mobile terminal, which includes a memory, a processor and a computer program stored in the memory and capable of running on the processor, the processor executing the computer program to implement the following operations:

a to-be-enabled sensor in sensors of the mobile terminal is determined according to a sensor enabling instruction;

it is determined that a sensor power-on event of the mobile terminal is triggered, and a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal;

in response to determining that the power-on delay corresponding to the target sensor is reached at a present moment, state resetting is executed on the target sensor; and it is determined that state resetting of the to-be-enabled sensor is completed, the to-be-enabled sensor is enabled to become an enabled sensor, and acquired data of the enabled sensor is reported.

In an implementation mode, the operation that the power-on delay of the target sensor of the mobile terminal is acquired includes that:

a first power-on delay of the to-be-enabled sensor is acquired; and the operation that the state resetting is executed on the target sensor in response to determining that the power-on delay corresponding to the target sensor is reached at the present moment includes that:

in response to determining that the first power-on delay is reached at the present moment, the state resetting is executed on the to-be-enabled sensor.

In an implementation mode, the operation that the power-on delay of the target sensor of the mobile terminal is acquired includes that:

a power-on delay of each sensor of the mobile terminal is acquired; and the operation that the state resetting is executed on the target sensor in response to determining that the power-on delay corresponding to the target sensor is reached at the present moment includes that:

in response to determining that the power-on delay of a corresponding sensor in each sensor is reached at the present moment, the state resetting is executed on the corresponding sensor.

In an implementation mode, after the operation that the acquired data of the enabled sensor is reported, the following operation is further included:

the state resetting is executed on sensors, except the enabled sensor, in the mobile terminal.

In an implementation mode, the mobile terminal further includes that:

in response to determining that the maximum power-on delay of the sensors of the mobile terminal is reached at the present moment, the state resetting is executed on sensors, except the enabled sensor, in the mobile terminal.

In an implementation mode, the mobile terminal further includes that:

a timer is started at the same time of determining that the sensor power-on event of the mobile terminal is triggered; and the operation that the state resetting is executed on the corresponding sensor in response to determining that the power-on delay of a corresponding sensor in each sensor is reached at the present moment includes that:

in response to determining that a timing value of the timer reaches the power-on delay of the corresponding sensor in each sensor, the state resetting is executed on the corresponding sensor.

Figure 5:
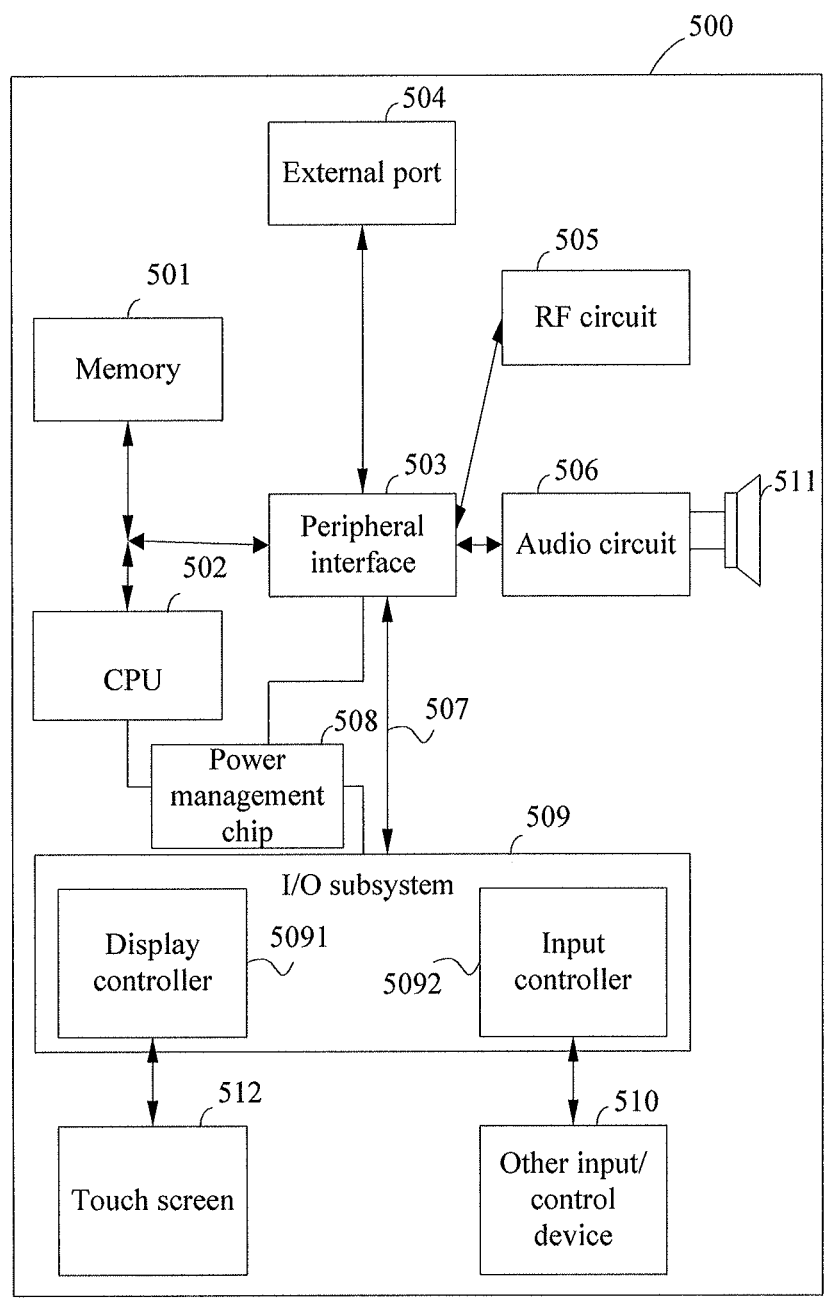
FIG. 5 is a structure diagram of a mobile terminal according to an embodiment of the application.

FIG. 5 is a structure diagram of a mobile terminal according to an embodiment of the application. The mobile terminal may include a control device for sensors of a mobile terminal in any embodiment of the application. As shown in FIG. 5, the mobile terminal may include: a memory 501 and a Central Processing Unit (CPU) 502 (also called as a processor). The memory 501 is configured to store an executable program code. The processor 502 reads the executable program code stored in the memory 501 to run a program corresponding to the executable program code to execute the following operations: a to-be-enabled sensor in sensors of the mobile terminal is determined according to a sensor enabling instruction; it is determined that a sensor power-on event of the mobile terminal is triggered, and a power-on delay of a target sensor of the mobile terminal is acquired, wherein the target sensor at least includes the to-be-enabled sensor and, in a case where there is one target sensor, the power-on delay of the target sensor is shorter than a maximum power-on delay of the sensors of the mobile terminal; in response to determining that the power-on delay corresponding to the target sensor is reached at a present moment, state resetting is executed on the target sensor; and it is determined that state resetting of the to-be-enabled sensor is completed, the to-be-enabled sensor is enabled to become an enabled sensor, and acquired data of the enabled sensor is reported.

The mobile terminal further includes: a peripheral interface 503, a Radio Frequency (RF) circuit 505, an audio circuit 506, a speaker 511, a power management chip 508, an Input/Output (I/O) subsystem 509, a touch screen 512, another input/control device 510 and an external port 504, and these components communicate through one or more communication buses or signal wires 507.

It is to be understood that the mobile terminal 500 shown in the figure is only an example of the mobile terminal, the mobile terminal 500 may have more or fewer components than those shown in the figure, two or more components may be combined or different component configurations may be made. Each component shown in the figure may be implemented in hardware including one or more signal processing and/or application specific integrated circuits, software or a combination of the hardware and the software.

A mobile terminal provided by the embodiment for controlling sensors of the mobile terminal will be described below in detail. For example, the mobile terminal is a mobile phone.

The memory 501: the memory 501 may be accessed by the CPU 502, the peripheral interface 503 and the like, and the memory 501 may include a high-speed Random Access Memory (RAM) and may further include a nonvolatile memory, for example, one or more disk storage devices, flash memories or other nonvolatile solid-stage storage devices.

The peripheral interface 503: the peripheral interface 503 may connect I/O peripherals of the device to the CPU 502 and the memory 501.

The I/O subsystem 509: the I/O subsystem 509 may connect the I/O peripherals of the device, for example, the touch screen 512 and the other input/control device 510 to the peripheral interface 503. The I/O subsystem 509 may include a display controller 5091 and one or more input controllers 5092 configured to control the other input/control device 510. Herein, the one or more input controllers 5092 receive electric signals from the other input/control device 510 or send electric signals to the other input/control device 510, and the other input/control device 510 may include a physical button (a pressing button and a rocker arm button), a dial, a slide switch, a joystick and a click roller. It is to be noted that the input controller 5092 may be connected with any one of a keyboard, an infrared port, a Universal Serial Bus (USB) interface and an indication device such as a mouse.

The touch screen 512: the touch screen 512 is an input interface and output interface between the user terminal and the user and displays visual output to the user, and the visual output may include a graph, a text, an icon, a video and the like.

The display controller 5091 in the I/O subsystem 509 receives an electric signal from the touch screen 512 or sends an electric signal to the touch screen 512. The touch screen 512 detects a contact on the touch screen, the display controller 5091 converts the detected contact into interaction with a user interface object displayed on the touch screen 512 to implement human-computer interaction, and the user interface object displayed on the touch screen 512 may be an icon of a running game, an icon of connection to a corresponding network and the like. It is to be noted that the device may further include an optical mouse, and the optical mouse is a touch-sensitive surface which does not display visual output or an extension of a touch-sensitive surface formed by the touch screen.

The RF circuit 505 is mainly configured to establish communication between the mobile phone and a wireless network (i.e., a network side) to implement data receiving and sending between the mobile phone and the wireless network, for example, receiving and sending of a short message and an electronic mail. In certain exemplary embodiments, the RF circuit 505 receives and sends an RF signal, the RF signal being also called an electromagnetic signal. The RF circuit 505 converts an electric signal into an electromagnetic signal or converts an electromagnetic signal into an electric signal and communicates with a communication network and another device through the electromagnetic signal. The RF circuit 505 may include a known circuit configured to execute these functions, and includes, but not limited to, an antenna system, an RF transceiver, one or more amplifiers, a tuner, one or more oscillators, a digital signal processor, a Coder-DECoder (CODEC) chip set, a Subscriber Identity Module (SIM) and the like.

The audio circuit 506 is mainly configured to receive audio data from the peripheral interface 503, convert the audio data into an electric signal and send the electric signal to the speaker 511.

The speaker 511 is configured to restore a voice signal received from the wireless network by the mobile phone through the RF circuit 505 into a sound and play the sound to the user.

The power management chip 508 is configured to perform power supply and power management on the CPU 502, the I/O subsystem and hardware connected with the peripheral interface 503.

It is to be noted that, for the control method for the sensors of the mobile terminal in the embodiments of the application, those of ordinary skill in the art may understand all or part of the flows implementing the control method for the sensors of the mobile terminal in the embodiments of the application and they may be completed by controlling, through a computer program, related hardware. The computer program may be stored in a computer-readable storage medium, for example, stored in a memory, and is executed by at least one processor, and an execution process may include the flows of the embodiments of the control method for the sensors of the mobile terminal. Herein, the storage medium may be a magnetic disk, an optical disk, a Read Only Memory (ROM), a RAM and the like.

The above is only the exemplary embodiment and applied technical principle of the application. The application is not limited to exemplary embodiments described herein. Those skilled in the art may make various obvious variations, regulations and replacements without departing from the scope of protection of the application. Therefore, the application, although being described through the above embodiments in detail, is not limited to the above embodiments and may further include more other equivalent embodiments without departing from the concept of the application, and the scope of the application is determined by the scope of the claims.

What is claimed is:

1. A control method for sensors of a mobile terminal, comprising:
   determining a to-be-enabled sensor in the sensors of the mobile terminal according to a sensor enabling instruction;
   a determining that a sensor power-on event of the mobile terminal is triggered and acquiring a power-on delay of a target sensor of the mobile terminal, wherein the target sensor at least comprises the to-be-enabled sensor and, in a case where there is one target sensor, the power-on delay of the target sensor is shorter than a maximum power-on delay of the sensors of the mobile terminal;
   executing, in response to determining that the power-on delay corresponding to the target sensor is reached at a present moment, state resetting on the target sensor; and
   determining that the state resetting on the to-be-enabled sensor is completed, enabling the to-be-enabled sensor so that the to-be-enabled sensor becomes an enabled sensor, and reporting acquired data of the enabled sensor.

2. The method as claimed in claim 1, wherein acquiring the power-on delay of the target sensor of the mobile terminal comprises:
   acquiring a first power-on delay of the to-be-enabled sensor; and
   executing, in response to determining that the power-on delay corresponding to the target sensor is reached at the present moment, the state resetting on the target sensor comprises:
   executing, in response to determining that the first power-on delay is reached at the present moment, the state resetting on the to-be-enabled sensor.

3. The method as claimed in claim 2, after reporting the acquired data of the enabled sensor, further comprising:
   executing state resetting on sensors, except the enabled sensor, in the mobile terminal.

4. The method as claimed in claim 2, further comprising:
   executing, in response to determining that the maximum power-on delay of the sensors of the mobile terminal is reached at the present moment, state resetting on sensors, except the enabled sensor, in the mobile terminal.

5. The method as claimed in claim 1, wherein acquiring the power-on delay of the target sensor of the mobile terminal comprises:
   acquiring a power-on delay of each sensor of the mobile terminal; and
   executing, in response to determining that the power-on delay corresponding to the target sensor is reached at the present moment, the state resetting on the target sensor comprises:
   executing, in response to determining that a power-on delay of a corresponding sensor in each sensor is reached at the present moment, state resetting on the corresponding sensor.

6. The method as claimed in claim 5, further comprising:
   starting a timer at the same time of determining that the sensor power-on event of the mobile terminal is triggered, wherein
   executing, in response to determining that a power-on delay of a corresponding sensor in each sensor is reached at the present moment, the state resetting on the corresponding sensor comprises:
   executing, in response to determining that a timing value of the timer reaches the power-on delay of the corresponding sensor in each sensor, the state resetting on the corresponding sensor.

7. The method as claimed in claim 5, wherein acquiring the power-on delay of each sensor of the mobile terminal comprises:
   acquiring the power-on delay of each sensor of the mobile terminal according to a sequence from short to long power-on delays.

8. A mobile terminal, comprising a memory, a processor and a computer program stored in the memory and capable of running on the processor, wherein the processor executes the computer program to implement the following operations:
   determining a to-be-enabled sensor in sensors of the mobile terminal according to a sensor enabling instruction;
   determining that a sensor power-on event of the mobile terminal is triggered, and acquiring a power-on delay of a target sensor of the mobile terminal, wherein the target sensor at least comprises the to-be-enabled sensor and, in a case where there is one target sensor, the power-on delay of the target sensor is shorter than a maximum power-on delay of the sensors of the mobile terminal;

executing, in response to determining that the power-on delay corresponding to the target sensor is reached at a present moment, state resetting on the target sensor; and determining that the state resetting on the to-be-enabled sensor is completed, enabling the to-be-enabled sensor so that the to-be-enabled sensor becomes an enabled sensor, and reporting acquired data of the enabled sensor.

9. The mobile terminal as claimed in claim 8, wherein acquiring the power-on delay of the target sensor of the mobile terminal comprises:

acquiring a first power-on delay of the to-be-enabled sensor; and executing, in response to determining that the power-on delay corresponding to the target sensor is reached at the present moment, the state resetting on the target sensor comprises:

executing, in response to determining that the first power-on delay is reached at the present moment, the state resetting on the to-be-enabled sensor.

10. The mobile terminal as claimed in claim 9, after reporting the acquired data of the enabled sensor, further comprising:

executing the state resetting on sensors, except the enabled sensor, in the mobile terminal.

11. The mobile terminal as claimed in claim 9, further comprising:

executing, in response to determining that the maximum power-on delay of the sensors of the mobile terminal is reached at the present moment, the state resetting on sensors, except the enabled sensor, in the mobile terminal.

12. The mobile terminal as claimed in claim 8, wherein acquiring the power-on delay of the target sensor of the mobile terminal comprises:

acquiring a power-on delay of each sensor of the mobile terminal; and executing, in response to determining that the power-on delay corresponding to the target sensor is reached at the present moment, the state resetting on the target sensor comprises:

executing, in response to determining that a power-on delay of a corresponding sensor in each sensor is reached at the present moment, state resetting on the corresponding sensor.

13. The mobile terminal as claimed in claim 12, further comprising:

starting a tuner at the same time of determining that the sensor power-on event of the mobile terminal is triggered, wherein executing, in response to determining the power-on delay of a corresponding sensor in each sensor is reached at the present moment, the state resetting on the corresponding sensor comprises:

executing, in response to determining that a timing, value of the timer reaches the power-on delay of the corresponding sensor in each sensor, the state resetting on the corresponding sensor.

14. The mobile terminal as claimed in claim 12, wherein acquiring the power-on delay of each sensor of the mobile terminal comprises:

acquiring the power-on delay of each sensor of the mobile terminal according to a sequence from short to long power-on delays.

* * * * *